US012652212B1

(12) United States Patent
Glozman et al.

(10) Patent No.:  US 12,652,212 B1
(45) Date of Patent:        Jun. 9, 2026

(54) SYSTEM, METHOD, AND COMPUTER PROGRAM FOR GENERAL INTENT TO SPECIFIC SERVICE MODELING IN INTENT-BASED ORCHESTRATION

(71) Applicant: Amdocs Development Limited, Limassol (CY)

(72) Inventors: Borislav Glozman, Ramat Gan (IL); Avi Chapnick, Ramat Gan (IL); Roy Segal, Mishmar-David (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 32 days.

(21) Appl. No.: 18/239,664

(22) Filed: Aug. 29, 2023

(51) Int. Cl.
  *H04L 41/0631*     (2022.01)
  *H04L 41/0668*     (2022.01)

(52) U.S. Cl.
  CPC ...... *H04L 41/0631* (2013.01); *H04L 41/0668* (2013.01)

(58) Field of Classification Search
  CPC ........................ H04L 41/0631; H04L 41/0668
  See application file for complete search history.

(56) References Cited

U.S. PATENT DOCUMENTS

|  |  |  |  |  |
|---|---|---|---|---|
| 9,882,833 | B2 * | 1/2018 | McBride | H04L 47/762 |
| 10,210,244 | B1 * | 2/2019 | Branavan | G06N 3/0455 |
| 10,536,287 | B1 * | 1/2020 | Leblang | G10L 15/22 |
| 10,536,288 | B1 * | 1/2020 | Leblang | H04M 3/563 |

| | | | | |
|---|---|---|---|---|
| 2015/0169285 | A1 * | 6/2015 | Reyes | G06F 3/167 |
| | | | | 715/728 |
| 2018/0114127 | A1 * | 4/2018 | Cole | H04L 67/52 |
| 2018/0123974 | A1 * | 5/2018 | McBride | H04L 47/762 |
| 2018/0143802 | A1 * | 5/2018 | Jang | G10L 15/30 |
| 2018/0152884 | A1 * | 5/2018 | Hu | H04W 8/18 |
| 2018/0262405 | A1 * | 9/2018 | Papageorgiou | H04L 41/5025 |
| 2019/0066161 | A1 * | 2/2019 | Peng | G06Q 30/0269 |
| 2019/0238410 | A1 * | 8/2019 | Kang | H04L 41/40 |
| 2020/0084120 | A1 * | 3/2020 | A | G06F 9/5027 |
| 2020/0175078 | A1 * | 6/2020 | Gueta | G06Q 30/0282 |
| 2020/0202847 | A1 * | 6/2020 | Mukherjee | G10L 15/1822 |
| 2020/0320407 | A1 * | 10/2020 | Xiao | G06F 16/214 |
| 2021/0144107 | A1 * | 5/2021 | Liang | G06N 5/04 |
| 2021/0176142 | A1 * | 6/2021 | Clarke | H04L 41/5051 |
| 2021/0266269 | A1 * | 8/2021 | McBride | H04L 67/1021 |
| 2021/0266376 | A1 * | 8/2021 | McBride | H04L 67/51 |
| 2021/0397796 | A1 * | 12/2021 | Dounis | G06F 40/279 |
| 2022/0116455 | A1 * | 4/2022 | Raghunath | H04L 47/822 |
| 2022/0157323 | A1 * | 5/2022 | Verma | G06F 3/167 |
| 2022/0172220 | A1 * | 6/2022 | Ladkat | G06Q 10/10 |
| 2022/0404790 | A1 * | 12/2022 | Amaro, Jr. | H04L 43/20 |
| 2023/0020613 | A1 * | 1/2023 | Drory | H04M 3/5191 |
| 2023/0308845 | A1 * | 9/2023 | Leijon | H04W 4/50 |
| 2024/0089217 | A1 * | 3/2024 | Raizer | H04L 47/822 |
| 2024/0177710 | A1 * | 5/2024 | Kumar Saha | G06F 40/30 |

* cited by examiner

*Primary Examiner* — Abdelbasst Talioua
(74) *Attorney, Agent, or Firm* — Zilka-Kotab, P.C.

(57)                    ABSTRACT

As described herein, a system, method, and computer program are provided for general intent to specific service modeling in intent-based orchestration. An intent specifying one or more parameters of a service required for a network is received. The intent is modeled as a root intent service that represents the one or more parameters of the service specified by the intent. The root intent service is decomposed into one or more specific services of a network orchestrator. The one or more specific services are caused to be instantiated in the network in order to fulfill the intent.

12 Claims, 5 Drawing Sheets

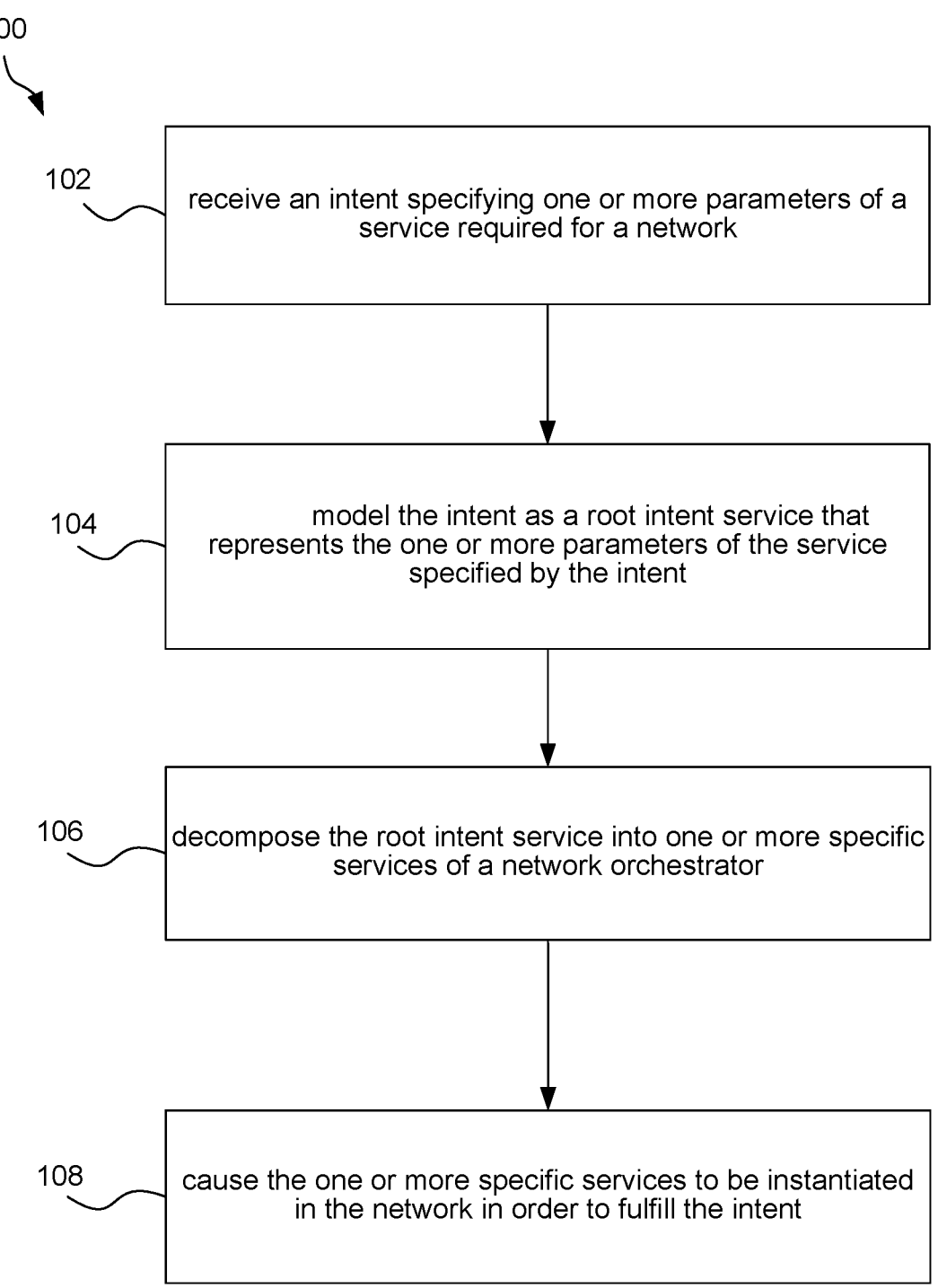

100

102  receive an intent specifying one or more parameters of a
     service required for a network 104  model the intent as a root intent service that
     represents the one or more parameters of the service
     specified by the intent 106  decompose the root intent service into one or more specific
     services of a network orchestrator 108  cause the one or more specific services to be instantiated
     in the network in order to fulfill the intent

USER INPUT
COMMAND

INTENT GENERATOR
202

INTENT

ORCHESTRATION SYSTEM
204

400

SYSTEM, METHOD, AND COMPUTER PROGRAM FOR GENERAL INTENT TO SPECIFIC SERVICE MODELING IN INTENT-BASED ORCHESTRATION

FIELD OF THE INVENTION

The present invention relates to intent-based network management and orchestration.

BACKGROUND

Intent-based orchestration, including network management and network orchestration, is one of the prominent tools in automation of modern networks and services. It refers to a form of network administration that incorporates modern computer technologies, such as machine learning, to automate administrative tasks across a network. Intent-based orchestration reduces the complexity of creating, managing and enforcing network policies and also reduces the manual labor associated with traditional configuration management.

In general, in intent-based orchestration, an intent-based command is issued by a user, usually from a non-technical business perspective. The command may be provided in a natural language and describes a request for a service, rather than how to implement the request. The particular intent of the user is derived from the command, and the intent is then translated to actions that are performed to achieve the user's intent.

However, the actual services are provided by orchestration systems that are separate from the tool used to receive intents from users. This creates a decoupling of services from intents, where the services may be introduced rapidly for different use-cases, and implemented by predefined orchestration systems. As a result, a translation between intents and the services of a given orchestration system is required.

There is thus a need for addressing these and/or other issues associated with the prior art. For example, there is a need to provide general intent to specific service modeling in intent-based orchestration.

SUMMARY

As described herein, a system, method, and computer program are provided for general intent to specific service modeling in intent-based orchestration. An intent specifying one or more parameters of a service required for a network is received. The intent is modeled as a root intent service that represents the one or more parameters of the service specified by the intent. The root intent service is decomposed into one or more specific services of a network orchestrator. The one or more specific services are caused to be instantiated in the network in order to fulfill the intent.

BRIEF DESCRIPTION OF THE DRAWINGS

FIG. 1 illustrates a method for general intent to specific service modeling in intent-based orchestration, in accordance with one embodiment.

DETAILED DESCRIPTION

Figure 2:
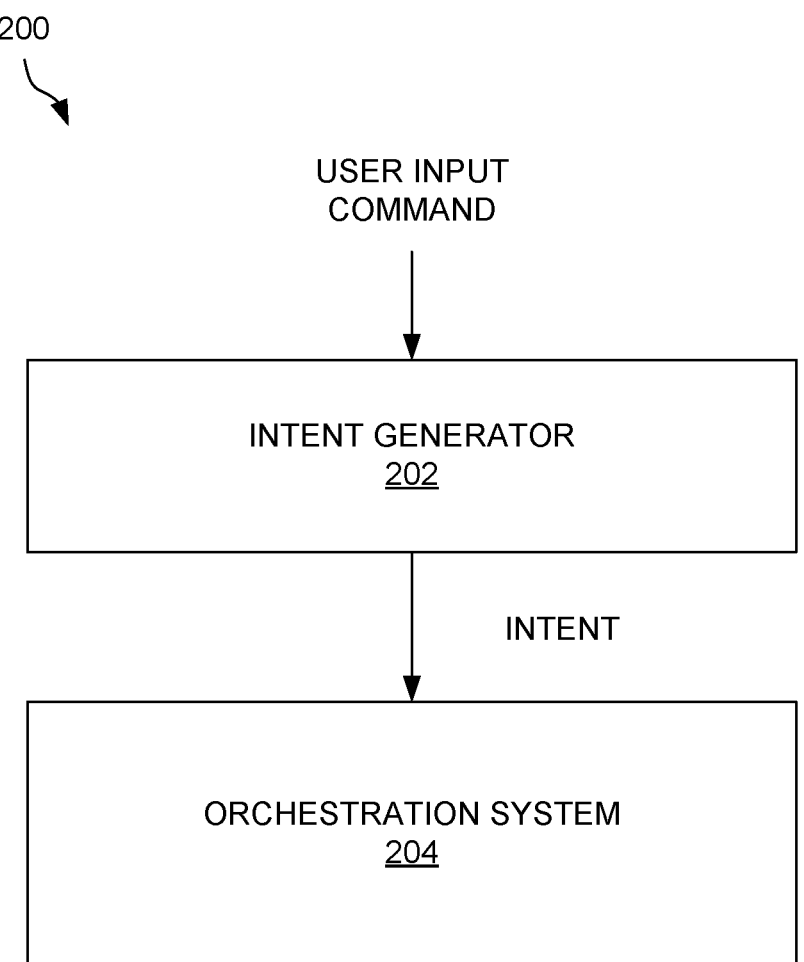
FIG. 2 illustrates a system for general intent to specific service modeling in intent-based orchestration, in accordance with one embodiment.

FIG. 1 illustrates a method 100 for general intent to specific service modeling in intent-based orchestration, in accordance with one embodiment. The method 100 may be carried out by a computer system, such as that described below with respect to FIGS. 4 and/or 5. For example, the method 100 may be performed by a computer system providing intent-based orchestration, or in other words by an orchestration system.

With respect to the present description, the intent-based orchestration refers to a method and system of network management and orchestration in which network tasks are automatically performed based on the intent derived from user input (natural language) commands. In an embodiment of intent-based orchestration, a command input by a user is processed to determine an intent of the user. The intent can then be processed to determine actions to take to achieve the user's intent.

In the context of the present embodiment, the method 100 may be performed by an orchestration system. The orchestration system interfaces an intents system, or intent generator (e.g. tool, etc.), that generates intents for intent-based orchestration. The orchestration system may process an intent received from the intents system in accordance with the method 100 described herein. The orchestration system refers to computer logic and/or a computer process that executes to perform the method 100. The orchestration system may be comprised of an intent-based orchestrator and a communication and network services orchestrator.

In operation 102, an intent specifying one or more parameters of a service required for a network is received. In an embodiment, the intent may be a formal description of a request associated with a service. The request may be to create a new service in a network, terminate an existing service in the network, modify an existing service in the network, etc. The service may refer to a business service or a network service.

In an embodiment, the intent may be generated based on a natural language input provided by a user. The natural language input may be a command associated with the service. In an embodiment, the natural language input may be processed to generate the intent, or in other words the intent may be derived from the natural language input. In an embodiment, the intent may be generated by an intent generator, and then received by an intent-based orchestrator.

As mentioned, the intent specifies one or more parameters of the service required for a network. In an embodiment, the parameter(s) may include properties of the service required for the network. In another embodiment, the parameter(s) may include constraints of the service required for the network. In another embodiment, the parameter(s) may include requirements of the service required for the network.

In operation 104, the intent is modeled as a root intent service that represents the one or more parameters of the service specified by the intent. The root intent service is a service-based representation of the intent. In an embodiment, the root intent service is structured differently from the one or more specific services of the network orchestrator. For example, the root intent service may be a generalized model of the intent. In an embodiment, the intent may be modeled by the intent-based orchestrator, for subsequent use by the network orchestrator, as described in detail below.

In embodiments, the root intent service may include one or more of properties, constraints, and/or requirements associated with the intent, such as those included in the parameters specified by the intent. In an embodiment, the root intent service may be one of a plurality of preconfigured root intent services (e.g. each having a different combination of properties, constraints, and/or requirements). For example, one of the preconfigured root intent services that matches the parameters specified by the intent may be selected to model the intent.

In an embodiment, the root intent service may model the intent by specifying the properties, policies (e.g. rules, constraints, optimization criteria), requirements, key performance indicators (KPIs), etc., in terms (e.g. types and constructs) of the communication and network service orchestrator. Translation logic (i.e. a knowledge-base) from intent (e.g. natural language) to root intent service may also be used. In an embodiment, the root intent service may be created dynamically by translating and aggregating the intent properties, requirement, etc., using intent-based orchestrator available logic. In any case, when intent is received in the intent-based orchestrator, the orchestrator knows how to translate it into a root intent service, which in turn can be processed by the communication and network service orchestrator and fulfilled.

In operation 106, the root intent service is decomposed into one or more specific services of a network orchestrator (i.e. the communication and network service orchestrator). The decomposing may be performed by the communication and network service orchestrator. The specific services refer to existing services of the network orchestrator that are capable of being implemented in a network. The specific services may be defined in accordance with a standard used by the network orchestrator.

In an embodiment, the one or more specific services of the network orchestrator may include communication services. In an embodiment, at least one of the communication services may be further decomposed into one or more network services of the network orchestrator. In another embodiment, the one or more specific services of the network orchestrator may include network services.

In an embodiment, decomposing the root intent service into the one or more specific services of the network orchestrator may include determining, from a plurality of specific services of the network orchestrator, the one or more specific services that fulfill the root intent service. For example, this may be accomplished by matching parameters of the root intent service to parameters of the plurality of specific services of the network orchestrator. In an embodiment, the network orchestrator may decompose the root intent service into communication and/or network services based on matching their services criteria (capabilities, properties, etc.) to the ones requested. In an embodiment, when multiple of the plurality of specific services of the network orchestrator fulfill a particular parameter of the root intent service, then an optimization algorithm may be used to select a specific service from among the multiple specific services to use to fulfill the root intent service. It should be noted that multiple communication/network services may be required to fulfill a single intent.

In operation 108, the one or more specific services are caused to be instantiated in the network in order to fulfill the intent. In an embodiment, causing the one or more specific services to be instantiated in the network may include causing the network orchestrator to create an instance of the one or more specific services in the network.

In an embodiment, a dynamic service tree that represents an intent fulfillment may be created. Further to this embodiment, the dynamic service tree may include the one or more specific services of the network orchestrator. In an embodiment, the one or more specific services may be instantiated in the network in accordance with the dynamic service tree.

To this end, the method 100 may be performed to model a general intent in order to translate the same to a specific service in intent-based orchestration. This method 100 may allow decoupling between the intent and the specific services that may be used in fulfillment of the intent. In this way, intent models may be added, as root intent services, without the need to change existing specific services of a network orchestrator, as well as new specific services of a network orchestrator can be added in order to implement intents without modification of those intents.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 2 illustrates a system 200 for general intent to specific service modeling in intent-based orchestration, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an intent generator 202 that receive an input command from a user and outputs an intent derived from the input command. In general, the intent may refer to a formal description of a required service (e.g. business, network, etc.) describing what is requested, rather than how to implement the request. The intent may specify one or more parameters of the service required for a network. The parameter(s) may include properties and/or requirements of the service.

The system 200 also includes an orchestration system 204 that receives the intent from the intent generator 202 and processes the intent to cause the relevant specific services of a network orchestrator of the orchestration system 204 to be instantiated in the network, for example in accordance with the method 100 of FIG. 1.

In an embodiment, an intent-based orchestrator of the orchestration system 204 models the intent as a root intent service that represents the one or more parameters of the service specified by the intent, then the network orchestrator decomposes the root intent service into one or more specific services, and further causes those specific services to be instantiated in the network in order to fulfill the intent.

Figure 3:
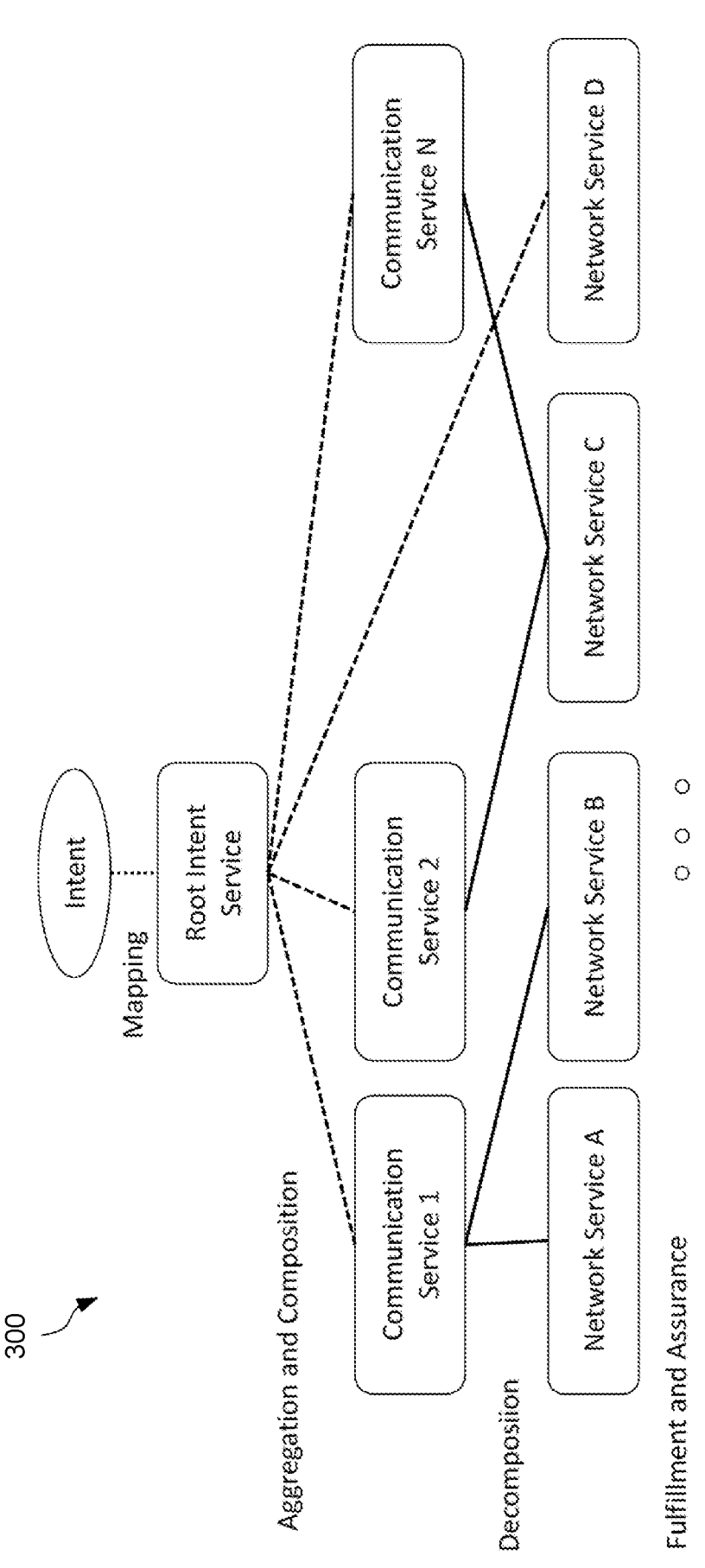
FIG. 3 illustrates a flow diagram of the system of FIG. 2, in accordance with one embodiment.

FIG. 3 illustrates a flow diagram of the orchestration system 204 of FIG. 2, in accordance with one embodiment.

Intent is a formal description of a required service (e.g. business, network, etc.) describing what is requested, rather than how to implement the request.

In an intent-based orchestrator of the orchestration system 204, an intent may be modeled as a service with some properties, constraints and/or requirements. Such intent services, referred to herein as root intent services, may be added or modified upon need. These services do not have to support a specific structure. The use of these services allows for the decoupling of the root intent service dependency on other orchestrated (specific) network services in the network orchestrator of the orchestration system 204 by detaching the intent from the specific network services that may fulfill it.

The intent-based orchestrator of the orchestration system 204 defines a root intent service that will represent the intent service in a generalized formal way, and that can be decomposed by the network orchestrator of the orchestration system 204 into specific services that may fulfill it. The network orchestrator will choose the specific (i.e. communication and/or network) services that can satisfy the root intent service, including identifying the optimal specific services and creating a dynamic service tree that will represent the intent fulfillment.

Once the dynamic service tree is created, the network orchestrator instantiates it in the network and assures it in accordance with intent requirements.

Exemplary Implementation

Some customer sends a request to an intent-based orchestrator for a service that will provide communication for drones in a specific area. The request holds a few requirements, such as latency (e.g. very low), area (e.g. Manhattan), throughput (e.g. 4K video), reliability (e.g. extremely reliable), availability (e.g. very high), security (e.g. prevent DDoS attacks, Encryption, Authorization, Authentication, . . . ), etc. This request (intent) is translated into a root intent service, which holds properties, requirements, constraints, etc. in a modeling language that the network orchestrator can operate with (e.g. TOSCA). Then the root intent service is decomposed into a network service (e.g. Ultra-Reliable Low Latency Communications (URLLC) network slice in the specific tracking areas with properties matching the root intent service) and a security service that deploys Firewall.

Authentication, Authorization and Accounting (AAA), transport layer security (TLS), and DDoS prevention. Those services are decomposed further (e.g. radio access network (RAN), 5G Core, etc.) and instantiated/configured on the network.

Figure 4:
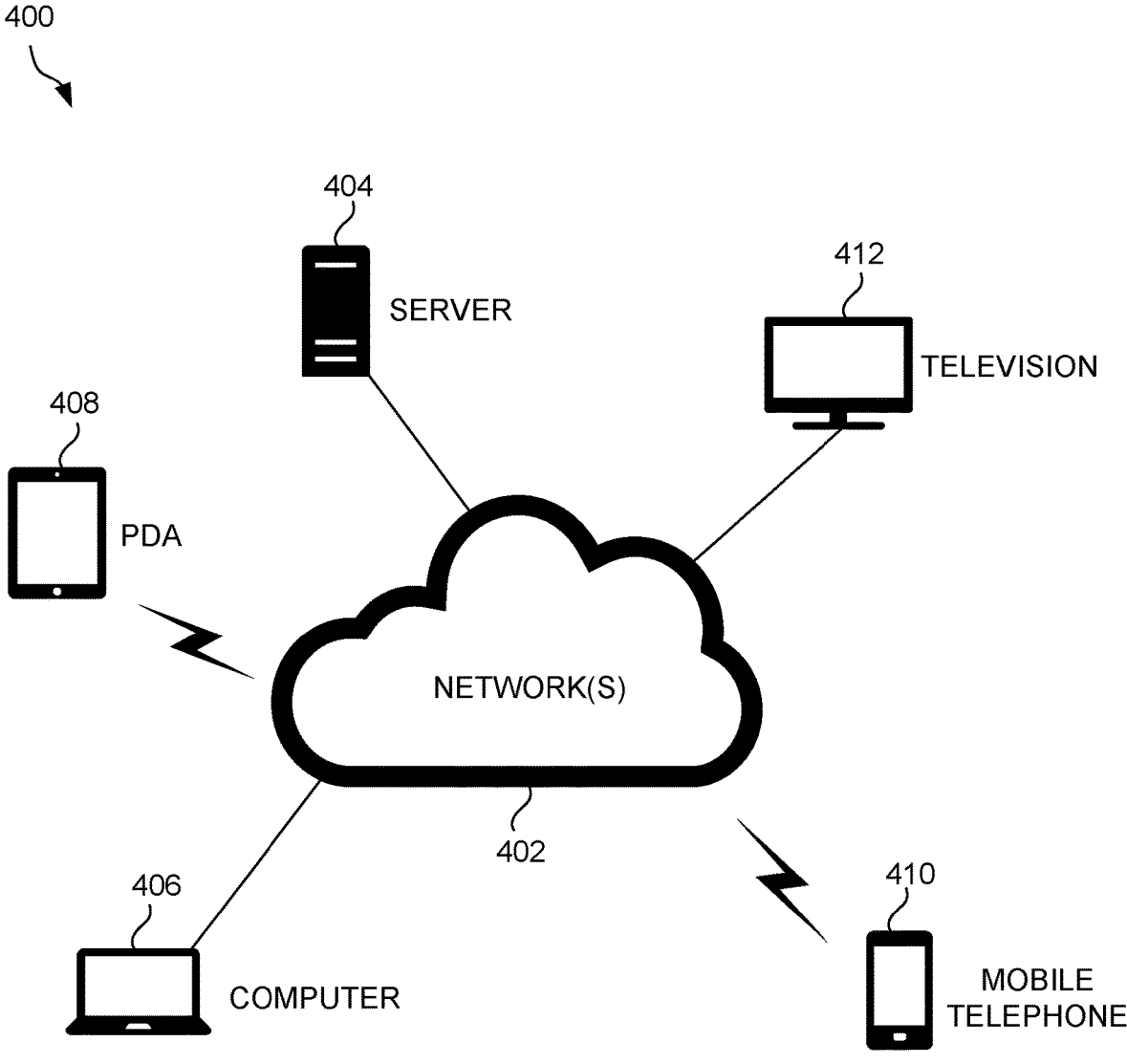
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
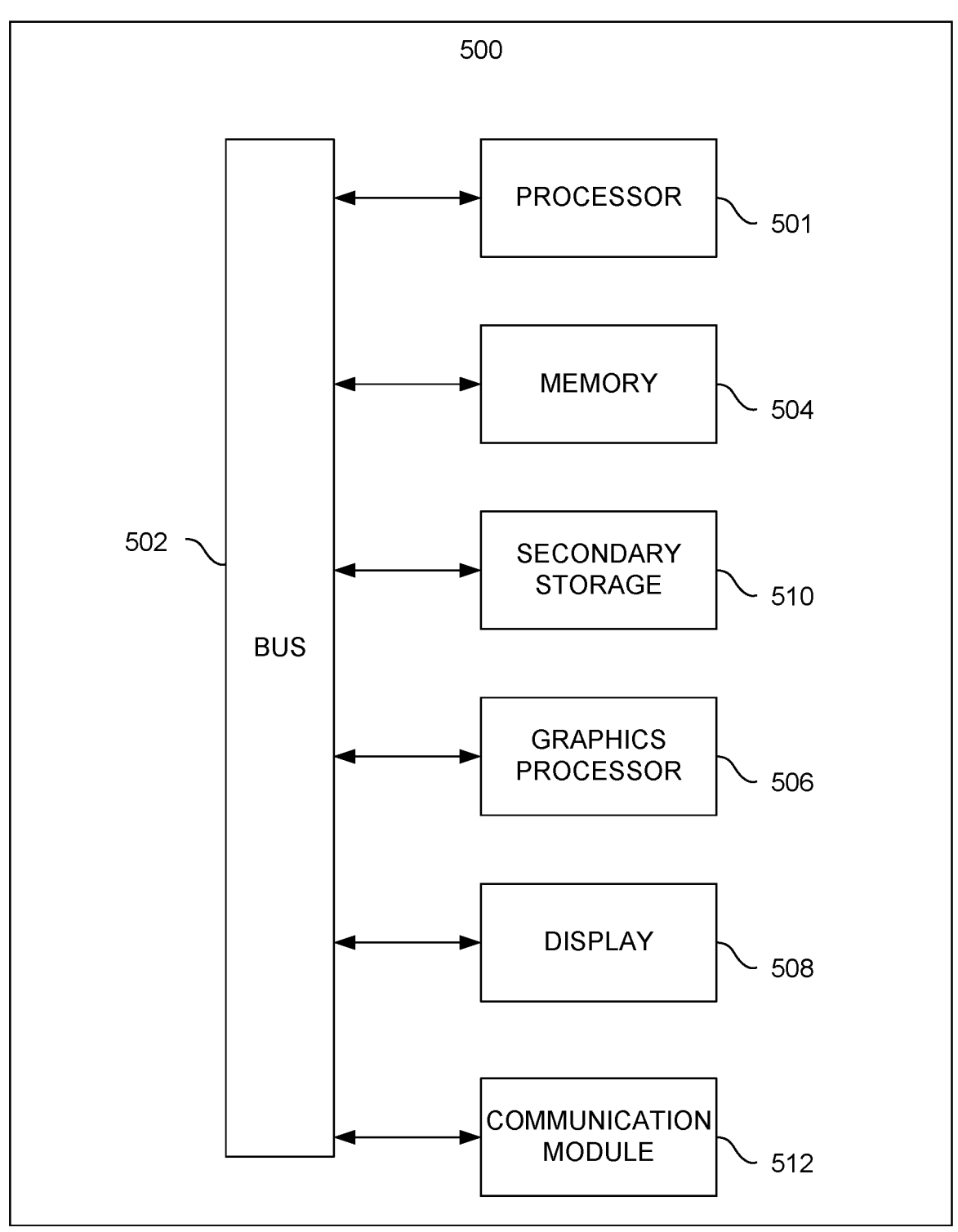
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic. magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

at a computer system:

receiving from a user an intent specifying one or more parameters of a service required for a network, the one or more parameters including at least one of properties, requirements, and constraints of the service required for the network;

determining one of a plurality of preconfigured root intent services that matches the one or more parameters specified by the intent received from the user, each preconfigured root intent service of the plurality of preconfigured root intent services having different parameter combinations and each preconfigured root intent service of the plurality of preconfigured root intent services being defined in a modeling language that is supported in a network orchestrator;

modeling the intent as the determined preconfigured root intent service that indicates in the modeling language the one or more parameters of the service specified by the intent;

decomposing, by the network orchestrator, the determined preconfigured root intent service into one or more existing services of the network orchestrator that represent the determined preconfigured root intent service by:

determining, for each of the one or more parameters of the determined preconfigured root intent service, one of a plurality of existing services of the network orchestrator that fulfill the parameter, determining that multiple of the plurality of existing services of the network orchestrator fulfill a same parameter of the one or more parameters, and in response using an optimization algorithm to select one existing service from among the multiple existing services to use to fulfill the parameter, and creating a dynamic service tree that indicates the one or more existing services of the network orchestrator that represent the determined preconfigured root intent service, the one or more existing services including a network service; and instantiating, in accordance with the dynamic service tree, the one or more existing services in the network in order to fulfill the intent, the instantiating including at least:

instantiating a network slice in the network for the network service.

2. A system, comprising:

a non-transitory memory storing instructions; and one or more processors in communication with the non-transitory memory that execute the instructions to:

receive from a user an intent input in a natural language and specifying one or more parameters of a service required for a network, the one or more parameters including at least one of properties, requirements, and constraints of the service required for the network;

determine one of a plurality of preconfigured root intent services that matches the one or more parameters specified by the intent received from the user, each preconfigured root intent service of the plurality of preconfigured root intent services having different parameter combinations and each preconfigured root intent service of the plurality of preconfigured root intent services being defined in a modeling language that is supported in a network orchestrator;

model the intent as the determined preconfigured root intent service that indicates in the modeling language the one or more parameters of the service specified by the intent;

decompose, by the network orchestrator, the determined preconfigured root intent service into one or more existing services of the network orchestrator that represent the determined preconfigured root intent service by:

determining, for each of the one or more parameters of the determined preconfigured root intent service, one of a plurality of existing services of the network orchestrator that fulfill the parameter, determining that multiple of the plurality of existing services of the network orchestrator fulfill a same parameter of the one or more parameters, and in response using an optimization algorithm to select one existing service from among the multiple existing services to use to fulfill the parameter, and creating a dynamic service tree that indicates the one or more existing services of the network orchestrator that represent the determined preconfigured root intent service, the one or more existing services including a network service; and instantiate, in accordance with the dynamic service tree, the one or more existing services in the network in order to fulfill the intent, the instantiating including at least:

instantiating a network slice in the network for the network service.

3. A non-transitory computer-readable media storing computer instructions which when executed by one or more processors of a device cause the device to:

receive from a user an intent input in a natural language and specifying one or more parameters of a service required for a network, the one or more parameters including at least one of properties, requirements, and constraints of the service required for the network;

determine one of a plurality of preconfigured root intent services that matches the one or more parameters specified by the intent received from the user, each preconfigured root intent service of the plurality of preconfigured root intent services having different parameter combinations and each preconfigured root intent service of the plurality of preconfigured root intent services being defined in a modeling language that is supported in a network orchestrator;

model the intent as the determined preconfigured root intent service that indicates in the modeling language the one or more parameters of the service specified by the intent;

decompose, by the network orchestrator, the determined preconfigured root intent service into one or more existing services of the network orchestrator that represent the determined preconfigured root intent service by:

determining, for each of the one or more parameters of the determined preconfigured root intent service, one of a plurality of existing services of the network orchestrator that fulfill the parameter, determining that multiple of the plurality of existing services of the network orchestrator fulfill a same parameter of the one or more parameters, and in response using an optimization algorithm to select one existing service from among the multiple existing services to use to fulfill the parameter, and creating a dynamic service tree that indicates the one or more existing services of the network orchestrator that represent the determined preconfigured root intent service, the one or more existing services including a network service; and instantiate, in accordance with the dynamic service tree, the one or more existing services in the network in order to fulfill the intent, the instantiating including at least:

instantiating a network slice in the network for the network service.

4. The non-transitory computer-readable media of claim 3, wherein the one or more parameters specified in the intent include the properties of the service required for the network.

5. The non-transitory computer-readable media of claim 3, wherein the one or more parameters specified in the intent include the constraints of the service required for the network.

6. The non-transitory computer-readable media of claim 3, wherein the one or more parameters specified in the intent include the requirements of the service required for the network.

7. The non-transitory computer-readable media of claim 3, wherein the one or more existing services of the network orchestrator include communication services.

8. The non-transitory computer-readable media of claim 7, wherein at least one of the communication services is further decomposed into one or more network services of the network orchestrator.

9. The non-transitory computer-readable media of claim 3, wherein the device is further caused to modify the determined preconfigured root intent service.

10. The non-transitory computer-readable media of claim 3, wherein at least one of the one or more existing services of the network orchestrator include a security service that fulfills a parameter of the determined preconfigured root intent service.

11. The non-transitory computer-readable media of claim 10, wherein the security service includes at least one of:

a firewall service, an Authentication, Authorization and Accounting (AAA) service, a transport layer security (TLS) service, or a DDoS prevention service.

12. The non-transitory computer-readable media of claim 3, wherein the network slice is an Ultra-Reliable Low Latency Communications (URLLC) network slice that is instantiated in an area specified by the one or more parameters of the determined preconfigured root intent service.

\* \* \* \* \*